Patented June 3, 1941

2,244,253

UNITED STATES PATENT OFFICE 2,244,253

SEPARATION OF SALTS OF AMINO-AMIDINES

William H. Hill, Stamford, Conn., assignor to American Cyanamid Company, New York, N. Y., a corporation of Maine No Drawing. Application November 9, 1939, Serial No. 303,623

4 Claims. (Cl. 260—564)

This invention relates to a process for the separation of the monobasic acid salts of ammonia and amino-amidines from polybasic acid salts of amino-amidines. In particular it relates to the purification of guanidine carbonate. The invention broadly consists in the application of a selective solvent to salt mixtures containing at least one of each of the above enumerated classes of salts whereby through the selective action of the solvent the monobasic acid salt or salts will be removed from the mass.

It is an advantage of my invention that it provides a simple and direct process for the quantitative separation of mixtures of salts of the above classes, which process can be used for the purification of polybasic acid salts of amino-amidines. It is a furthe advantage of the process of my invention that it is applicable generally to the separation of monobasic acid salts of ammonia and amino-amidines from polybasic acid salts of amino-amidines in all cases where these amidines are stronger bases than ammonia.

The amino-amidine bases, which when combined with polybasic acids form the class of salts to be treated within the compass of the invention, are constituted by guanidine, biguanide and the substituted guanidines and biguanides, the salts of which are stable in liquid anhydrous ammonia. Without this category and not falling within the scope of the invention are those amidines which being of less basicity than ammonia produce salts with polybasic acids which are unstable in liquid anhydrous ammonia. An example of such a salt is guanylurea sulfate which in liquid anhydrous ammonia breaks down to give the free base guanylurea, soluble in the ammonia, and ammonium sulfate, insoluble therein.

In the preparation of polybasic acid salts of guanidine such as guanidine carbonate and guanidine sulfate the monobasic acid salt guanidine nitrate has been used as a starting material because of its cheapness. Other monobasic acid salts of guanidine may however serve as starting materials in the synthesis of polybasic acid salts of guanidine, such for example as the chloride, thiocyanate, acetate, etc. The products from such syntheses may contain some unreacted starting salt as impurity and may also contain some small quantities of ammonium salts. For example it was found that guanidine carbonate prepared from guanidine nitrate as a starting material contained some of the latter salts. The presence of the nitrate is particularly objectionable since excessive quantities of this impurity may create a fire hazard in the material. In some uses of guanidine salts, for example in unhairing hides, guanidine nitrate is especially undesirable.

Now I have found that the above impurities may be removed from amino-amidine mixtures of the above defined class by subjecting them to the action of a selective solvent which is a member of the group consisting of liquid ammonia and strong aqueous ammonia containing not less than 50% ammonia. As has previously been stated the selective solvent process of my invention can be applied generally to the purification of polybasic acid salts of the amino-amidines defined above and for this reason the process may be used to advantage for the purification of such salts as may be contaminated by reason of their method of manufacture with the salts of monobasic acids of the class described above. Accordingly the invention will be described with reference to the purification of guanidine carbonate contaminated with guanidine nitrate, and possibly also with ammonium nitrate, present therein by reason of the process employed for the manufacture of the carbonate.

By way of illustrating the application of the process of my invention to the purification of guanidine carbonate contaminated as described above, the following examples are given which are not intended to be limiting of the invention.

Example 1

Finely pulverized guanidine carbonate produced by the process described above and containing guanidine nitrate and possibly also ammonium nitrate is added to liquid anhydrous ammonia until a paste is obtained which can be easily handled e. g. stirred and filtered. The paste is stirred until the monobasic acid salts are dissolved, e. g. ½ hour, and then filtered. If maximum freedom from the nitrates is desired the filter cake is resuspended in liquid anhydrous ammonia, again filtered and this process repeated until all the nitrates originally present are removed.

Alternatively the guanidine nitrate can be extracted from the guanidine carbonate in an apparatus similar to the Soxhlet extracter in which liquid anhydrous ammonia is trickled through the guanidine carbonate supported on a filter. The liquid anhydrous ammonia containing the nitrates originally present is evaporated, condensed and reused. The impurities which will gradually accumulate in the ammonia still are then withdrawn from time to time and can be used again in the manufacture of guanidine nitrate and guanidine carbonate in accordance with their nature.

The process of the present invention can be applied in any other suitable or advantageous way for example in countercurrent fashion in which the solvent containing the highest quantity of impurities is used to extract the fresh batch of impure salt and the salt thereafter being contacted with increasingly purer liquid anhydrous ammonia.

*Example 2*

Guanidine carbonate as in Example 1 was dissolved in water and ammonia gas introduced therein until the concentration of ammonia in the solution reached 50% strength. The precipitated guanidine carbonate was then filtered off, dried, and on analysis was found to be substantially free from nitrates.

While the invention has been described with particular reference to the purification of guanidine carbonate it may be equally well applied to the purification of biguanide carbonate, or of corresponding sulfates or other polybasic acid salts of amino-amidines of the class described.

What I claim is:

1. The process of separating a monobasic acid salt of one of the group consisting of ammonia and the guanidines and biguanides from a mixture containing essentially the same and a polybasic inorganic oxy acid salt of the guanidines and biguanides which comprises subjecting the mixture to the action of a selective solvent which is a member of the group consisting of liquid ammonia and strong aqueous ammonia containing not less than 50% of ammonia to extract the monobasic acid salt.

2. The process of separating a monobasic acid salt of one of the group consisting of ammonia and the guanidines and biguanides from a mixture containing essentially the same and a carbonate of the guanidines and biguanides, which comprises subjecting the mixture to the action of a selective solvent which is a member of the group consisting of liquid ammonia and strong aqueous ammonia containing not less than 50% of ammonia to extract the monobasic acid salt.

3. The process of purifying guanidine carbonate containing a minor proportion of a nitrate of the group consisting of the guanidines and biguanides as impurity therein which comprises subjecting the mixture to the action of a selective solvent which is a member of the group consisting of liquid ammonia and strong aqueous ammonia containing not less than 50% of ammonia to extract the nitrate.

4. The process of purifying guanidine carbonate containing a minor proportion of guanidine nitrate as impurity therein which comprises subjecting the mixture to the action of a selective solvent which is a member of the group consisting of liquid ammonia and strong aqueous ammonia containing not less than 50% of ammonia to extract the guanidine nitrate.

WILLIAM H. HILL.